United States Patent [19]
Belden

[11] 3,801,130
[45] Apr. 2, 1974

[54] BICYCLE WITH PIVOTABLE REAR WHEEL

[75] Inventor: Ralph A. Belden, Cascade Locks, Oreg.

[73] Assignee: Ralph A. Belden; Philip P. Brasseur, and Eugene V. H. Brasseur, all of Spokane, Wash.; a part interest to each

[22] Filed: Sept. 25, 1972

[21] Appl. No.: 291,953

Related U.S. Application Data
[63] Continuation of Ser. No. 74,688, Sept. 23, 1970, abandoned.

[52] U.S. Cl.............. 280/240, 280/265, 280/268, 280/271, 280/288
[51] Int. Cl.............. B62k 21/10, B62k 25/00
[58] Field of Search .......... 280/263, 264, 265, 266, 280/267, 270, 271, 240, 268, 269, 87.04 A, 280/87.04 R

[56] References Cited
UNITED STATES PATENTS
| | | | |
|---|---|---|---|
| 3,620,547 | 11/1971 | Vaverek | 280/87.04 A |
| 602,034 | 4/1898 | Murphy | 280/266 |
| 205,921 | 7/1878 | Stafford | 280/271 |
| 88,205 | 3/1869 | Plass | 280/266 |
| 3,062,559 | 11/1962 | Hewitt | 280/270 X |
| 3,069,182 | 12/1962 | Hufford | 280/267 X |
| 94,056 | 8/1869 | Allen | 280/267 |

*Primary Examiner*—David Schonberg
*Assistant Examiner*—John P. Silverstrim
*Attorney, Agent, or Firm*—Wells, St. John & Roberts

[57] ABSTRACT

A two wheeled, rider propelled vehicle having both wheels pivotably mounted upon a medial principal frame. The pivotable rear wheel frame supports pedal mechanism propelling the rear wheel and may be steered by the feet of the user. Mechanical biasing means communicate between the pivotable rear wheel frame and main frame to bias motion and a latching mechanism allows fixed positioning of the two members. A vertically adjustable seat is fixedly carried by the principal frame and the forward portion of the vehicle provides a traditional manually steerable, pivotably mounted front wheel frame.

3 Claims, 4 Drawing Figures

RALPH A. BELDEN INVENTOR.

BICYCLE WITH PIVOTABLE REAR WHEEL

RELATED APPLICATIONS

This is a continuation of co-pending application heretofore filed by the same inventor on Sept. 23, 1970 under Ser. No. 74,688, now abandoned.

BACKGROUND OF THE INVENTION

1. Field of Invention

This invention relates generally to the field of bicycles and more particularly to a bicycle having a pivotably mounted, steerable rear wheel with associated pedal-type propelling mechanism.

2. Description of Prior Art

Various forms of wheeled, cycle type, operator propelled vehicles have heretofore become known, the bicycle undoubtedly being the most common. My invention provides a vehicle of this type wherein a main frame upon which the rider sits pivotably mounts in its rearward part a steerable rear wheel frame carrying the rear wheel and associated pedal-type propelling mechanism.

My device is distinguishable from a one wheeled vehicle or unicycle, aside from the number of wheels, in that the frame upon which the rider sits on the unicycle does not pivot about a vertical axis perpendicular to the axis of rotation of the wheel of the vehicle. It is further readily distinguishable from the three wheeled or tricycle type vehicle, again aside from wheel number, in that it is not propelled by pedal mechanism associated with the front wheel. Both unicycles and tricycles by reason of their peculiar wheel structure require different balance and operating techniques of steerage, propulsion and the like than the two-wheeled bicycle, and are thereby readily distinguishable from my invention in both structure and function.

Heretofore two wheeled bicycles with pivotably mounted rear wheels have become known. One form that provided pedal mechanism associated with the front wheel may be distinguishable from the instant invention in that this driving linkage pulls the vehicle rather than pushing it as in my bicycle that is operated by linkage associated with the rear wheel. Another form of such a bicycle provides locomotion by a hand operated leverage system associated with the front wheel to again be distinguishable on the basis of structure.

Other two wheeled bicycles that have provided pivotable mounting of both front and rear wheels, have provided some mechanical linkage between the two wheels to require each to move with its plane of rotation parallel to that of the other. Such vehicles have generally provided some parallelogram type linkage of levers or connecting rods crossed in "X" fashion to link the wheels to require parallel motion for more simple steerage and stability. My invention is distinguishable from these devices in that its front and rear wheels are independently pivotable without mechanical linkage therebetween and with neither wheel moving in any related fashion to the other except as directed by an operator.

My invention is further distinguishable from the prior art in allowing releasable biasing or locking of the pivotable linkage of the rear wheel frame to the principal frame to provide the function of an ordinary bicycle if desired.

SUMMARY OF INVENTION

My invention provides a two wheel, operator propelled vehicle comprising generally a main frame pivotably mounting in its forward portion a steerable front wheel structure and pivotably mounting in its rearward portion a pivotable back wheel structure. The main frame carries an adjustable seat part to support an operator in seated position for pedaling. The forward wheel structure provides handle bars to aid manual steering. The back wheel structure has associated pedal-type propelling mechanism irrotatably carried relative the back wheel structure to allow propulsion and steering. A spring releasably extends between the pivotably back wheel structure and the main frame to bias the back wheel to a straight course and releasable catch means are provided to lock the rear wheel structure's motion relative the main frame. Either front or rear wheel, however, may pivot completely independently of the other and the angular orientation of either relative the frame may be controlled by an operator.

In providing such a mechanism it is:

A principal object of my invention to create a bicycle having a pivotably mounted rear wheel frame that may pivot about a substantially vertical axis perpendicularly to the axis of wheel rotation, independently of the front wheel.

A further object of my invention to provide such a device that has pedal-type propelling mechanism, associated with the rear wheel, that may be manipulated by the operator to direct the angular orientation of the rear wheel.

A further object of my invention to provide such a vehicle with both mechanical biasing and catching means communicating between the rear wheel frame and the principal frame, to stabilize linear motion of the vehicle and allow its operation as a traditional bicycle.

A still further object of my invention to provide such a vehicle that is of new and novel design, of rugged and durable nature, of simple and economic manufacture, and otherwise well adapted to the uses and purposes for which it is intended.

Other and further objects of my invention will appear from the following specification and accompanying drawings which form a part thereof. In carrying out the objects of my invention, however, it is to be understood that its essential features are susceptible of change in design and structural arrangement, with only one preferred and practical embodiment being illustrated in the accompanying drawings as required.

BRIEF DESCRIPTION OF DRAWINGS

In the accompanying drawings which form a part of this specification and wherein like numbers of reference refer to similar parts throughout.

DESCRIPTION OF PREFERRED EMBODIMENT

Figure 1:
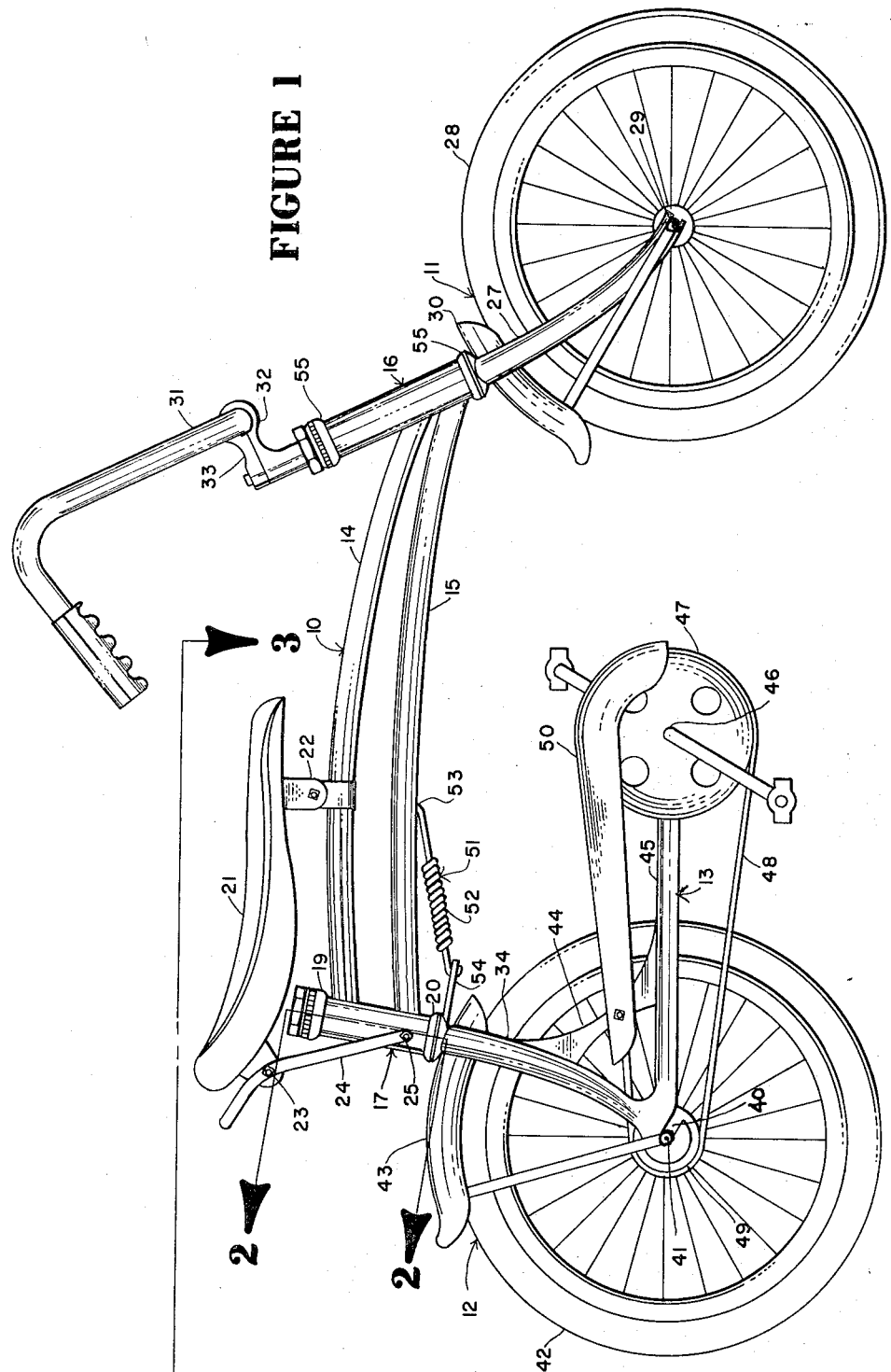
FIG. 1 is an orthographic side view of my bicycle showing its parts, their configuration and relationship.

Referring now to the drawings in more detail and particularly to that of FIG. 1, it will there be seen that my invention comprises generally a two wheeled vehicle having main frame 10 pivotably mounting front wheel structure 11 in its forwardmost part and back wheel structure 12 with associated propelling-steering mechanism 13 in its rearwardmost part.

Figure 2:
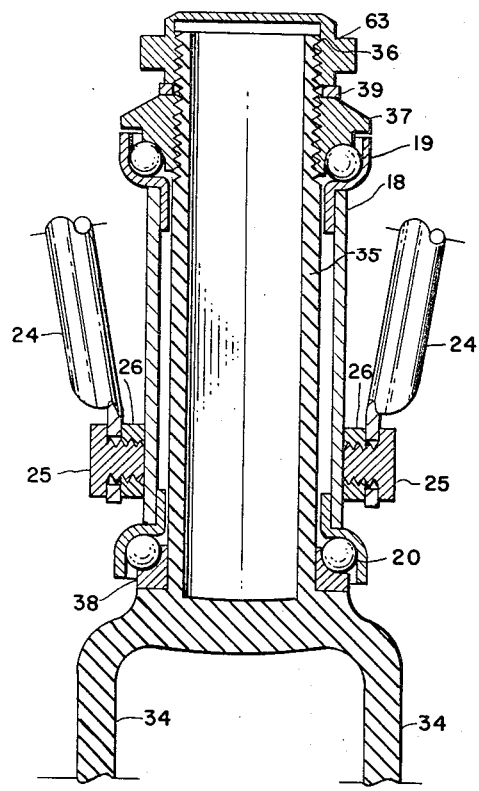
FIG. 2 is an enlarged, partial, cross sectional view of the rear journal of my invention, taken on the line 2—2 of FIG. 1, looking rearward in the direction indicated by the arrows thereon.
Figure 3:
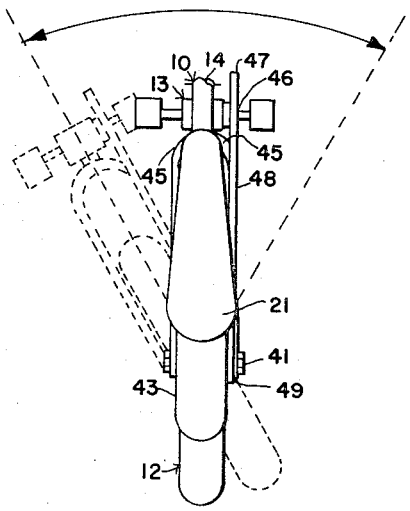
FIG. 3 is a partial, orthographic top view taken on a projection plane such as that illustrated by the trace 3—3 on FIG. 1 in the direction indicated by the arrows thereon, with on positional variation shown in dotted outline.
Figure 4:
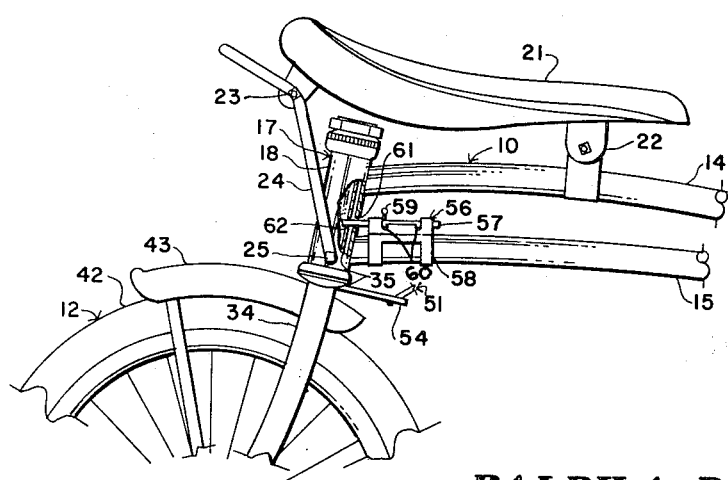
FIG. 4 is a partially cutaway view of a latching mechanism that may be used with my invention to fixedly position the rear wheel frame.

Main frame 10 comprises elongate, vertically spaced upper beam 14 and lower beam 15 structurally communicating between forward journal 16 and rearward journal 17, each disposed at diverging angles from a medial vertical line to appropriately position the wheel structure for added stability. Each of the journals 16, 17 is of similar nature; as illustrated in FIG. 2, cylindrical, medial journal body 18 carries upper thrust bearing 19 and lower thrust bearing 20 in its end parts by a press fit or other mechanical attachment. The shaft of the wheel structure then fits within the medial cylindrical area of the journal between the bearings to provide a pivotable mounting. This type of journal is known in the bicycle art.

Seat 21, carried for vertically adjustable positioning in the rearward part of the frame 10, in its forward part pivotably communicates with slideably adjustable frame clamp 22 and in its rearward part by bolt-nut combinations 23 to paired, opposed rear seat supports 24. The rear seat supports are mounted on paired opposed studs 25 threadedly engaged in nuts 26 structurally carried by cylindrical journal body 18 in medial positions on the lateral parts. With this arrangement of parts and an arcuate, upwardly curved upper beam 14, the vertical position of seat 21 may be adjusted by moving forward clamp 22 forwardly or rearwardly along the beam 14. This type of seat again is known in the bicycle arts.

Front wheel structure 11 provides front wheel fork 27 depending forwardly and downwardly to rotatably mount front wheel 28 in its end part on horizontal, releasably positionable axle 29. Forward fender 30 is mounted in fork 27 at appropriate position immediately above the front wheel. The upper portion of fork 27 is configured as a cylinder to pivotably mount within forward journal 16 with upper and lower cones 55 immediately outwardly adjacent the thrust bearings. Handle bars 31 are adjustably mounted in handle bar bracket 32 carried in the upper part of depending handle bar brackets arm 33 pivotably adjustably carried by the upper part of front wheel fork 27 so that the vertical angular relationship of handle bars 31 may be adjusted by bracket 32 and the horizontal angular relationship between the handle bars and front wheel 38 may be adjusted in the communication with front wheel fork, all to provide the traditional, steerable, front wheel structure known in the bicycle art, with handle bars irrotatable relative the front wheel and both rotatable relative principal frame 10.

Back wheel structure 12 provides "Y" shaped back wheel fork 34, similar in structure to the front wheel fork, having uppermost cylindrical body 35 pivotably mounted within the internal void of rearward journal 17 between upper and lower thrust bearing 19, 20. The uppermost portion of body 35 provides thread 36 to engage upper cone 37 and the portion of body 35 immediately below lower thrust bearing 20 provides lower cone 38 to maintain the structure in the bearing. Lock washer 39 is provided between the upper surface of upper cone 37 and cap nut 63 to aid in maintaining the elements in position.

The lowermost portion of each arm of back wheel fork 34 is provided with opposed cooperating channels 40 to receive threaded bicycle axle 41 rotatably mounting rear wheel 42. Rear fender 43 is mounted between the back wheel fork elements immediately above the rear wheel in appropriate position. With this linkage it is seen that back wheel structure 12 may pivot or rotate relative main frame 10.

Propelling mechanism 13 is carried by the pedal frame formed by principal chord 45 and angle support 44, each structurally communicating in their rearward portions with back wheel fork 34 and in the medial part of the principal chord with each other. The forward portion of principal chord 45 pivotably mounts the axle of ordinary bicycle pedal 46. This pedal in its medial axle part irrotatably carries driving cog 47 which communicates by endless roller chain 48 to wheel cog 49 supported upon rear wheel axle 41. An ordinary bicycle coaster brake communicates between wheel cog 49 and rear wheel 42 to provide a power train from the pedal to the rear wheel. Chain guard 50 extends over the upper part of driving cog 47 and chain 48 to protect the operator and his clothing therefrom. This propelling mechanism again is not new per se and in general is known in the bicycle arts, except for its particular mounting. It is to be noted in this regard that the propelling mechanism is supported entirely upon back wheel structure 12 and free of the principal frame to provide a foot operated steering lever for the back wheel structure.

In some instances linear stability of motion, or at least a tendency toward such stability, may be desired in my vehicle. If so, mechanical biasing 51 may be provided between back wheel structure 12 and main frame 10. The biasing structure illustrated comprises extension spring 52 communicating from hole 53 in lower beam 15 rearwardly and downwardly to fastening bracket 54 structurally carried by the rear wheel fork structure.

Similarly it may be desirable at times to releasably fix the rear wheel structure relative the principal frame to provide an operation of my vehicle of the same nature as that of an ordinary bicycle. If so, this may be accomplished by catching means 56 providing pin latch 57 slideably mounted in bracket 58 and adjustably positionable therein by manual positioning of pin handle 59 within one of the bracket notches 60. The rearward part of pin 57, its rearward position, fits within cooperating holes 61, 62 in bearing body 18 and back wheel fork body 35 respectively to lock the pivotable motion therebetween.

Having thusly described the structure of my invention its operation may be understood.

Firstly a bicycle is constructed according to the foregoing specification. To use it a rider first adjusts the vertical positioning of seat 21 for comfortable accommodation and then seats himself thereupon astraddle main frame 10 with feet upon opposed pedals 46 and hands upon handle bars 31. In this position he then operates the pedals to rotate driving cog 47 and thusly rear wheel 42 to cause motion in the vehicle. The direction of motion may be regulated by changing the angular orientation of either front wheel 28 or rear wheel 42 relative main frame 10 or relative to each other.

The angular positioning of the front wheel structure 11 relative the principal frame is determined by manual manipulation of handle bars 31. The angular position of back wheel structure 12 is regulated by pediatric manipulation of pedal structure 13.

With completely independent angular positioning of both front and rear wheels the motion of the vehicle may be quite erratic to such degree as desired by the operator. If it be desired to limit this motion, especially during learning endeavors with the vehicle, biasing device 51 such as the mechanical spring illustrated may be used. If more erratic activity be desired for novelty type riding or as an amusement, the mechanical biasing may be done away with. If it be desired to use the vehicle as an ordinary bicycle, catching means 56 may be engaged in the rear wheel pivot to fixedly position it. Obviously other types of mechanical biasing and locking might accomplish the same purpose as the specific embodiments illustrated.

It is to be particularly noted that both front and rear wheels may pivot entirely independently of each other and each in fact is rotatable so that either may occupy any rotary position at any time; this mechanical configuration may give rise to any type of motion possible with a two wheeled vehicle having a rigid frame.

It is further to be noted that the angular position of the rear wheel structure relative the main frame may be controlled by pediatric manipulation during the pedaling operation or at other times. Obviously some skill must be attained to accomplish this steerage but with practice it is quite possible.

The foregoing description of my invention is necessarily of a detailed nature so that a specific embodiment of it might be set forth as required but it is to be understood that various modifications of detail, rearrangement and multiplication of parts may be resorted to without departing from its spirit, essence, or scope.

Having thusly described my invention, what I desire to protect by Letters Patent, and what I claim is:

1. A bicycle comprising:

a rigid upright main frame having front and rear ends;

a saddle fixidly mounted to said main frame for support of a rider;

a front fork journalled intermediate its upper and lower ends about a first upright axis at the front end of the main frame, said front fork having a front wheel rotatably mounted to its lower end;

a handlebar assembly fixed to the upper end of said front fork;

a rear fork journalled at its upper end about a second upright axis at the rear end of the main frame, said rear fork having a rear wheel rotatably mounted to its lower end about a rear wheel axis;

a rigid pedal frame fixed to the rear fork and extending outwardly therefrom alongside said rear wheel;

foot-operated pedal means movably mounted to the outer end of said pedal frame, said pedal means being drivingly connected to said rear wheel for turning said rear wheel about said rear wheel axis;

said rear fork being free to move about said second upright axis independently of movement of said front fork about said first upright axis;

the angular position of the front fork relative to the main frame about said first upright axis being controllable by the hands of the rider through the handlebar assemblies;

the angular position of the rear fork relative to the main frame about said second upright axis being controllable by the feet of the rider through the pedal means and pedal frame independently of the angular position of the front fork about said first axis.

2. A bicycle as set out in claim 1, wherein said pedal frame is cantilevered forwardly from the rear fork in a substantially horizontal orientation.

3. A bicycle as set out in claim 1, wherein the second upright axis diverges downwardly and rearwardly from the vertical.

* * * * *